United States Patent [19]

Webster et al.

[11] 4,107,254

[45] Aug. 15, 1978

[54] METHOD OF LINING PIPES, MOLDS OR OTHER TUBULAR ARTICLES WITH THERMOSETTING PLASTIC MATERIAL

[75] Inventors: John David Webster; Thomas John Jewell, both of St. Austell, England

[73] Assignee: English Clay Lovering Pochin & Co. Ltd., England

[21] Appl. No.: 623,060

[22] Filed: Oct. 16, 1975

Related U.S. Application Data

[63] Continuation of Ser. No. 395,065, Sep. 7, 1973, abandoned.

[30] Foreign Application Priority Data

Sep. 14, 1972 [GB] United Kingdom ............... 42785/72

[51] Int. Cl.$^2$ .......................... B29D 9/00; B29G 7/00

[52] U.S. Cl. .................................... 264/270; 264/102; 264/219; 264/225; 264/338; 264/344

[58] Field of Search ............... 264/270, 269, 311, 338, 264/219, 225; 164/116

[56] References Cited

U.S. PATENT DOCUMENTS

| | | | |
|---|---|---|---|
| 1,620,831 | 3/1927 | Moore | 164/116 |
| 1,678,641 | 7/1928 | Holthaus | 164/116 |
| 1,802,613 | 4/1931 | Millspaugh | 164/116 |
| 2,344,020 | 3/1944 | Boucher | 164/116 |
| 2,349,213 | 5/1944 | Van Niekerk | 264/311 |
| 2,675,333 | 4/1954 | Trout et al. | 264/270 |
| 3,290,426 | 12/1966 | Barrentine | 264/311 |
| 3,584,105 | 6/1971 | Pekor | 264/311 |

FOREIGN PATENT DOCUMENTS

| | | | |
|---|---|---|---|
| 552,223 | 11/1956 | Italy | 264/270 |

*Primary Examiner*—James B. Lowe
*Attorney, Agent, or Firm*—Larson, Taylor and Hinds

[57] ABSTRACT

A method of lining a pipe with settable material including the steps of arranging the pipe with its longitudinal axis inclined at an angle to the horizontal, introducing a selected amount of liquid material into the pipe at a predetermined rate so that the liquid material flows down along the pipe, shifting the pipe to a horizontal position and spinning the pipe about its axis to distribute the material, spinning continuing until the material has set. The method is particularly applicable for lining pipes with polyurethane. For pipes with end flanges end faces of the lining material can be formed integral with the lining.

11 Claims, 4 Drawing Figures

Figure 1:
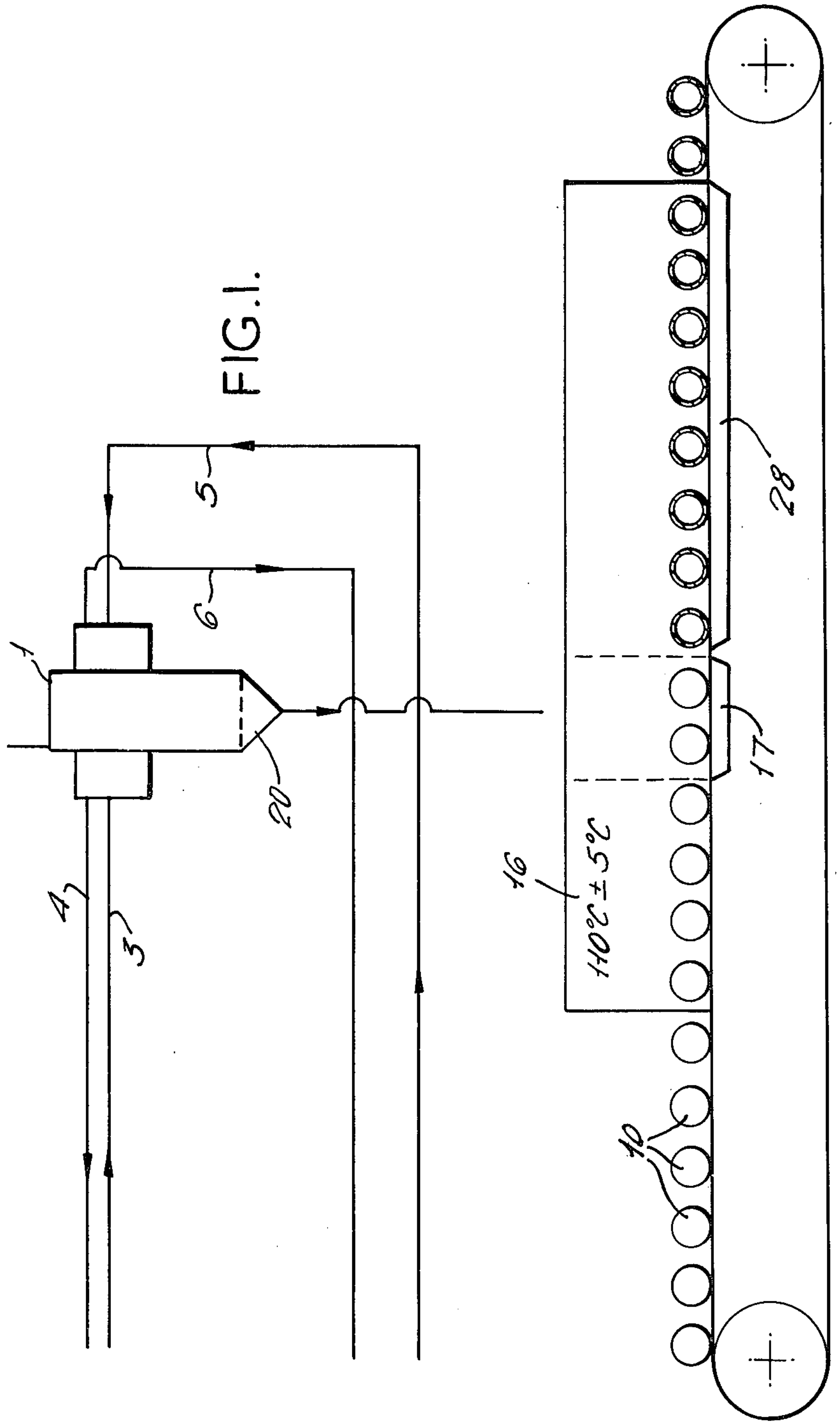

METHOD OF LINING PIPES, MOLDS OR OTHER TUBULAR ARTICLES WITH THERMOSETTING PLASTIC MATERIAL

This is a continuation, of application Ser. No. 395,065 filed Sept. 7, 1973, and now abandoned.

This invention relates to a method of lining a pipe, mould or other tubular or hollow cylindrical article with a settable material which can be introduced into a pipe in liquid form and which material is capable of setting to form a solid material. The invention is particularly, although not exclusively, applicable to the lining of pipes with resilient synthetic plastics material, e.g. polyurethane.

According to one aspect of the present invention there is provided a method of lining a pipe, mould or other tubular or hollow cylindrical article, herein referred to as a pipe, with a settable material which can be introduced into a pipe in liquid form and which material is capable of setting to a solid material, the method comprising arranging the pipe with its longitudinal axis inclined at a predetermined acute angle to the horizontal, introducing at a predetermined rate of selected amount of the liquid material into an upper part of the pipe, the angle of inclination of the pipe and the rate of introduction of the liquid material being so arranged that the liquid material which is first introduced into the pipe flows along the inside wall of the pipe to a predetermined lower part of the pipe in the same time as that for completing the introduction of the selected amount of liquid material whereby the material is distributed along a length of the pipe, thereafter shifting the pipe to a horizontal position and spinning the pipe about its longitudinal axis to distribute the liquid material around the inside of the wall of the pipe, spinning being continued until the material has set.

The pipe can be held stationary during the introduction of the liquid material, but for long pipes or for liquid materials which are rather viscous, the pipe may be rotated slowly during the introduction step to assist the flow of liquid material along the pipe. The liquid material will usually be introduced at a constant rate to obtain an even distribution of material along the length of the pipe; however, in some cases it would be possible to use a varying rate of introduction if required, for example to obtain a resultant lining which has a varying thickness along the pipe.

Conveniently, the material is introduced at the upper end of the pipe and the rate of introduction and angle of inclination are arranged so that the material first introduced flows to the lower end of the pipe, whereby the entire length of the inside of the pipe may be formed with a lining.

The ends of the pipe may be provided with flanges which are fitted with covers prior to introduction of the liquid material so that the liquid cannot flow out of the ends during spinning before the material has set. The covers may be spaced from the end flanges of the pipe so that liquid flows into the annular spaces between the covers and the flanges whereby the lining when formed extends radially at each end of the pipe to form an end face of the lining material integral with the lining itself.

The material for lining the pipe is preferably a resilient synthetic plastics material, for example a polyurethane made from a urethane elastomer prepolymer by reaction with a suitable curing agent such as a diamine. The reagents are prepared and mixed in liquid form and immediately after mixing the curing reaction commences, the liquid polyurethane gradually becoming more viscous until it sets. Generally speaking the curing process is more rapid at higher temperatures and the initial period, after mixing the reagents, within which the mixed liquid reagents are still workable — referred to as the "pot life" — becomes shorter with increase in temperature. This is an important consideration when using the polyurethane for the lining method according to the invention since the introduction of the liquid polyurethane and the subsequent spinning of the pipe to distribute the liquid polyurethane must be carried out within the pot life period. Preferably, therefore, the rate of introduction of the liquid polyurethane should be such that the time taken to introduce the selected amount comprises not more than 50% of the pot life of the polyurethane.

Advantageously, especially where the material for lining the pipes is a thermosetting material, the pipes are pre-heated to a suitable temperature prior to introducing the material, the temperature being chosen according to the required pot life of the material and also according to the viscosity of the mix. At higher temperatures the viscosity of most liquids decreases and clearly this will affect the rate at which the liquid material flows down the pipe for a given angle of inclination of the pipe.

According to another aspect of the present invention there is provided a method of lining a pipe, mould or other tubular or hollow cylindrical article, referred to as a pipe, the method comprising arranging the pipe with its longitudinal axis inclined at an acute angle to the horizontal, delivering a settable liquid material into an upper part of the pipe, the angle of inclination of the pipe being so arranged according to the viscosity of the liquid that as the liquid flows down the pipe the liquid material is distributed along a length of the pipe, cutting off delivery of the liquid material, and spinning the pipe about its axis to distribute the liquid material around the inside of the pipe, spinning being continued until the material has set.

Figure 2:
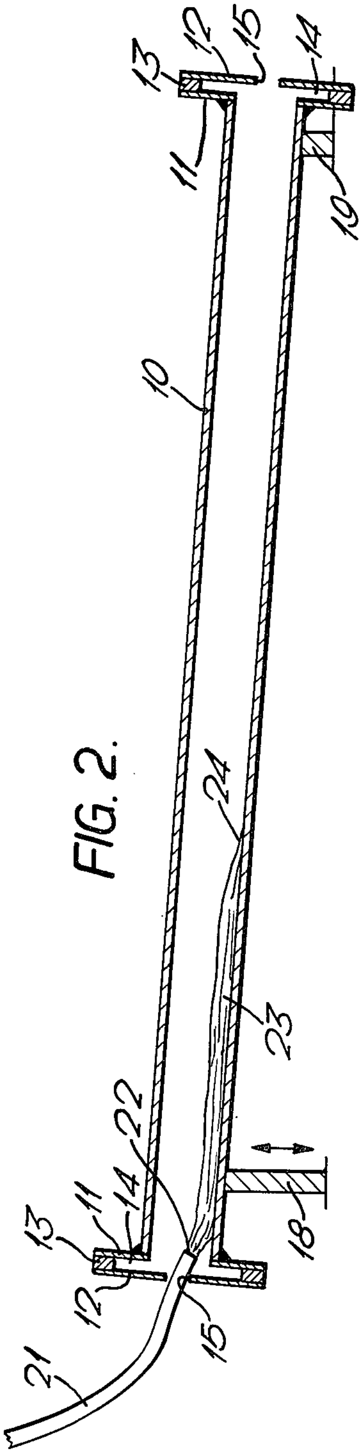
Figure 3:
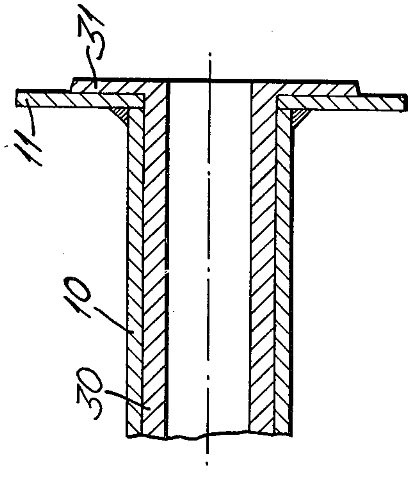
Figure 4:
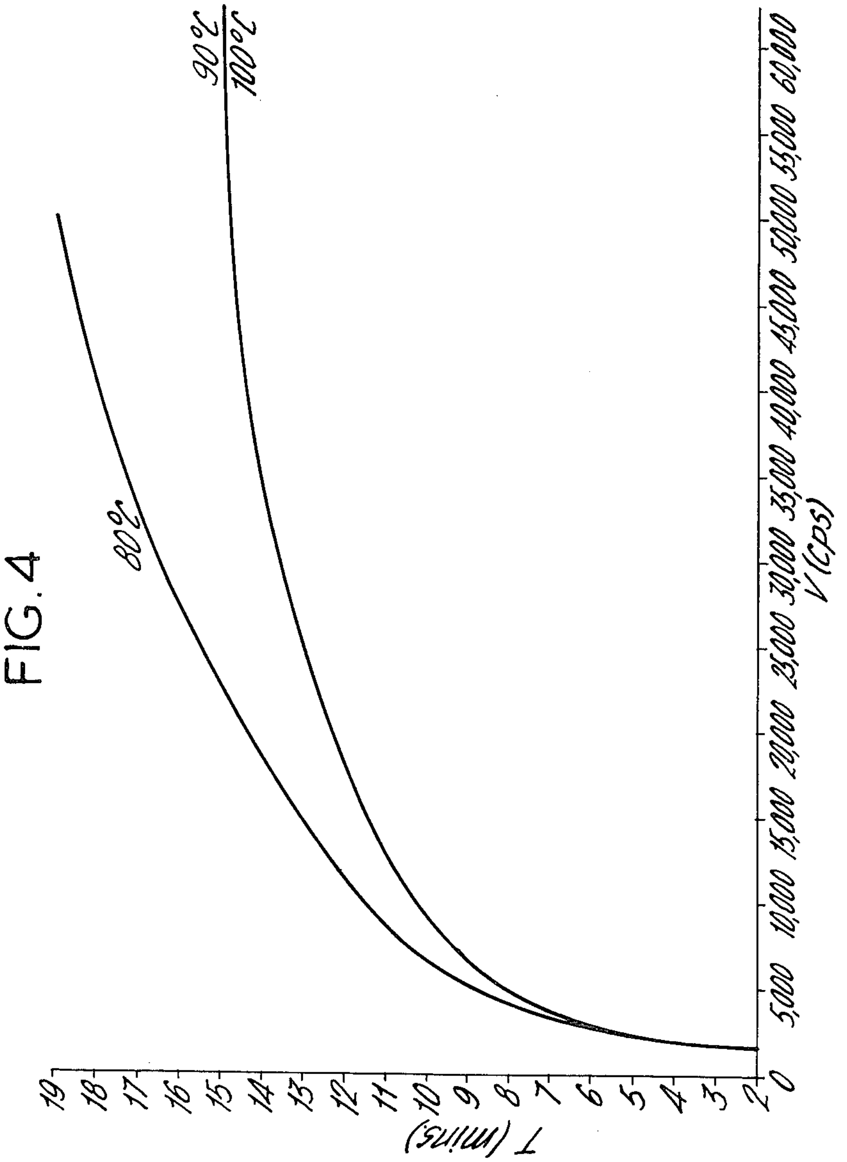

The invention may be carried into practice in a number of ways but one specific embodiment will now be described, by way of example only, with reference to the accompanying drawings, in which:

FIG. 1 is a schematic diagram showing one arrangement for carrying out a method according to the invention, of lining pipes, FIG. 2 shows a sectioned pipe having polyurethane lining material in liquid form delivered into it, FIG. 3 shows a section of one end of a pipe lined according to the method of the embodiment, and FIG. 4 is a viscosity/time graph for the mixed urethane elastomer and its curing agent used as the lining material of the specific embodiment.

In many applications, particularly in the mining industry, it is necessary to pump highly abrasive slurries and other liquids containing mineral solids through pipes over considerable distances, and it has been found that ordinary steel pipes suffer greatly from wear due to abrasion by the mineral solids.

To reduce the excessive wear it is proposed to line the steel pipes with a suitable polyurethane which in its cured state has a high tensile strength and resilience and very high resistance to abrasion. One polyurethane which has been found to be entirely satisfactory during testing is that made by reacting an isocyanate-terminated polyether and a diamine curing agent. The reactants may be prepared by a continuous process so as to enable the lining of the steel pipes to be carried out almost continuously.

In the specific embodiment to be described the isocyanate-terminated polyether is Adiprene (Registered Trade Mark) and the curing agent is 4,4'-methylene-bis(2-chloro-aniline) (M.O.C.A.). The Adiprene, preferably Adiprene L-100, is reacted with the MOCA curing agent to form linear high-molecular-weight polyurethanes, the mixing and curing temperatures being selected to enable the lining technique to be carried out and to yield a highly consistent product. The Adiprene and the MOCA are preferably prepared and stored separately at appropriate temperatures, the reagents being continuously recycled to a mixing head which can be operated as required to mix the reagents at a temperature within the curing range of the polyurethane, and discharge the liquid polyurethane for introduction into the pipe to be lined.

Referring to FIG. 1 of the drawings there is shown a mixing head 1 through which, at one side, the Adiprene is recycled via supply and return lines 3 and 4 and at the other side the MOCA is recycled via supply and return lines 5 and 6, the Adiprene and MOCA being recycled from and to respective temperature controlled storage tanks (not shown). The Adiprene is supplied at a temperature of approximately 90° C. and the MOCA at a temperature of approximately 120° C. To ensure that these temperatures are maintained substantially constant, the supply and return lines are enclosed by oil pipes for circulating hot oil, for example from heating oil jackets of the Adiprene and MOCA storage tanks, through the respective sides of the mixing head 1. This also ensures that the mixing head 1 is maintained at the required temperatures of the reactants.

The metal, for example steel, pipes to be lined are, in one arrangement, approximately 20 ft. long and 4 inches external diameter. Each pipe 10 is provided at each end with a radial flange 11 welded to it. The pipes, referenced 10 in the drawings, are first cleaned internally by brushing, wiping or shot blasting, and after cleaning, the insides of the pipes are sprayed with a suitable metal-to-polyurethane bonding agent, for example a bonding agent known as CHEMLOK. After cleaning and spraying a cover 12 is bolted to each flange 11, the cover having an integral spacer ring 13 so as to afford an annular cavity 14 adjacent the radially inner part of each flange 11 (see FIGS. 2 and 3) the purpose of which will be explained. The covers 12 each have a centrally-aligned hole 15 somewhat smaller than the inside diameter of the pipe after lining.

The cleaned pipes 10 with the attached covers 12 are then placed in an oven 16 for pre-heating. The oven is preferably maintained at 100° ± 5° C., this being the most suitable temperature for introducing the liquid polyurethane and for the subsequent curing of the polyurethane. However, the method may be useful if the pipes are preheated to within the range 80° – 120° C. The pipes 10 are preheated for approximately 1 hour before being passed on to the next station 17 in the oven 15 where the polyurethane is to be introduced.

Two of the preheated pipes 10 are moved into the "filling" and spinning station 16 onto supports 18 and 19 and the support 18 of each pipe is then raised slightly (by approximately 4 ins.) to incline the longitudinal axis of each pipe 10 at a small angle to the horizontal. The pipes 10 are then ready for introducing the liquid polyurethane mix.

A mixing tool in the mixing head 1 is then driven to rotate at a high speed and, by means of a compressed-air operated arrangement (not shown), valves are opened in the mixing head 1 so that Adiprene and MOCA are pumped under a pressure of 28 lb./sq.in. through suitable metering orifices at a delivery ratio of 8:1 down to the mixing tool enclosed by a nozzle 20 where the Adiprene and MOCA are thoroughly mixed. The mixed Adiprene and MOCA is then discharged at a rate of 10 kg/min. through the nozzle 20, and down through a flexible hose 21 (see FIG. 2) the lower end 22 of which has been inserted, via a door opening of the oven 16, into the hole 15 of the cover 12 at the raised end of one of the pipes 10.

The polyurethane liquid mixture indicated at 23 in FIG. 2 flows from the end 22 of the hose 21 and by virtue of the inclination of the pipe 10 the liquid polyurethane flows fairly slowly down the pipe towards the lower end. The rate of flow of the polyurethane 23 is governed by the viscosity/time relationship of the setting polyurethane liquid and the angle of inclination of the pipe and these two interrelated factors, together with the rate of introduction of the polyurethane are so arranged that by the time the polyurethane which was first delivered to the pipe, indicated at 24, has just reached the lower end of the pipe, a preselected amount of polyurethane will have been introduced and will be distributed fairly uniformly along the entire length of the bottom of the inside of the pipe.

It will be appreciated that even during the time taken to introduce the liquid polyurethane, curing will commence and the viscosity of the mixture will begin to rise fairly rapidly. Furthermore the curing reaction is exothermic and the heat produced will cause a slight rise in temperature of the mix. The precise angle which the pipe 10 must be inclined is therefore an empirical factor and must be determined for each set of conditions, namely the temperature and pot life of the polyurethane mixture, the temperature of the pipe, the pipe length and diameter, and the amount and rate of polyurethane delivered. A typical graph of the variation of the viscosity of Adiprene/MOCA mixture with time is shown in FIG. 4 of the drawings.

In one specific case where Adiprene at 90° C. was mixed with MOCA at 120° C., the mixture having a pot life of approximately 10 mins. was fed into the pipe preheated to 110° C.; the pipe was 20 ft. long and 3.744 ins. inside diameter, the pipe having a wall thickness of 0.128 ins.; the lining required was to be ¼ inch thick and for such a lining a total of 20 kg. of polyurethane were required; the head discharged the mixed Adiprene and MOCA at 10 kg/min. so that the period of introducing the mixture was 2 minutes. In order that the mixture flowed to the lower end of the pipe in exactly 2 minutes a pipe inclination of 0° 54' was used. For a 20 ft. pipe of 6.625 ins. outside diameter pipe and 6.337 ins. inside diameter an angle of inclination of 0° 34' was found to be satisfactory to produce a lining of similar thickness under the same conditions of reagent temperatures and liquid polyurethane introduction rate.

After the predetermined amount of polyurethane has been delivered, the mixing head is shut off and the hose end 22 is transferred for delivery to the other pipe at the station 17. The "filled" pipe 10 is immediately lowered to a horizontal position by lowering the support 18 and by means of driven rollers which are moved into engagement with the outside of the filled pipe the pipe is then spun at 800 – 900 r.p.m. As spinning commences the polyurethane liquid is distributed by centrifugal action evenly around the entire inside periphery of the pipe 10 and into the cavities 14 adjacent the end flanges 11. If air bubbles are entrained in the polyurethane liquid inside the pipe, these can be removed by blowing a blast of hot air at 250° C. ± 10° C. into the pipe for a period of 40 – 50 seconds at the start of spinning. The heat from this air blast causes the entrained air bubbles to expand and burst so that the liquid is substantially air-free when it is distributed evenly round the pipe by the spinning.

Spinning is continued for a period of 20 – 25 minutes until the polyurethane sets to a solid. In practice the second pipe is "filled" immediately after the first pipe is started spinning and the two pipes are then kept spinning at the same time for the duration of the setting period.

After the selected amount of polyurethane has been delivered to the second pipe the mixing head 1 is again shut off until mixing is required again for delivery of polyurethane to the next pair of preheated pipes. When it is shut off the mixing head should be flushed out with methylene chloride solvent to avoid the risk of any of the polyurethane mixture being left in the nozzle 20 and on the mixing tool which would become solid and foul the operation of the mixing head.

After spinning, the pipes are moved on to a curing stage 28 in the oven 16 where the temperature of the pipes is further maintained at 110° C. ± 5° C. for a period of 2½ – 3 hours to complete the curing of the polyurethane to form a rubbery solid lining having the desired properties.

The pipes are then removed from the oven and the covers 12 removed. As shown in FIG. 3, the lining 30 of polyurethane is of substantially constant inside diameter and is integral with the radial polyurethane end faces 31 extending partly over the ends of the pipe flanges 11. These integral polyurethane end faces 31 serve as sealing members when the pipes are bolted together to form a pipe line. The end faces 31 are, of course, optional and may be omitted during production.

The lined pipes may be wrapped with protective coverings until ready to be used.

The method of the present invention has been successfully applied for lining pipes of from 3 to 12 inches outside diameter but it is believed that the method could readily be adapted for lining pipes of almost any length and diameter, even up to several feet in diameter. The thickness of the lining may also be arranged to be from 1/16 inch to almost any limit approaching a solid pipe.

As a result of the spinning a lining having a constant bore diameter along the length of the pipe is obtained. However, if the pipe itself is not straight there is a possibility that the lining will not be formed as a uniform thickness around the pipe. To avoid this the pipe can be straightened temporarily during spinning by means of suitable pressure rollers applied to the outside of the pipe so that the lining is formed of constant inside diameter even though the pipe may substantially return to a non-straight, e.g. slightly bowed, form. By this means a lining can be produced to small tolerances on the lining thickness and bore diameter.

Whilst in the specific embodiment described above the lining process is discontinuous in that delivery of the polyurethane only takes place every time a pair of pipes have completed their spinning stage, it will be appreciated that the installation could readily be adapted to almost continuous production. Furthermore the whole process both of preparing and delivering the polyurethane and the preparation and control of the pipes may be made entirely automatic.

The invention is not limited only to the lining of pipes but may be applied to the manufacture of self-supporting synthetic plastics pipes, the steel pipes of the embodiment being adapted for use as moulds. The principle of the invention may also be used for lining any hollow elongate article which can be inclined to allow delivery of the liquid material along the inside of the article and then spun to distribute the lining around the inside periphery of the article.

We claim:

1. A method of lining a pipe, mould or other tubular or hollow cylindrical article, herein referred to as a pipe, with a thermosetting synthetic plastics material which can be introduced into a pipe in the form of a liquid mixture of prepolymer and curing agent, which mixture is capable of setting to a resilient solid material, the method comprising arranging the pipe with its longitudinal axis inclined at a predetermined acute angle to the horizontal, introducing into an upper part of the pipe a selected amount of the liquid mixture from a mixing head which is operated for a predetermined period of time to mix the prepolymer and the curing agent passing therethrough and discharge the resulting mixture flowing therefrom at a substantially constant predetermined rate directly into the pipe, the pipe being held stationary while the liquid material is introduced, the angle of inclination of the pipe and the rate of introduction of the liquid mixture being so arranged that the liquid mixture which is first introduced into the pipe flows along the inside wall of the pipe to a predetermined lower part of the pipe in the same time as that for completing the introduction of the selected amount of liquid mixture, whereby the material is distributed along a length of the pipe, thereafter shifting the pipe to a position in which its longitudinal axis is horizontal and then spinning the pipe about its longitudinal axis to distribute the liquid mixture around the inside of the wall of the pipe, spinning being continued until the plastics material has set.

2. A method as claimed in claim 1, wherein the liquid mixture is introduced at the upper end of the pipe and wherein the rate of introduction and the angle of inclination of the pipe are arranged so that the material first introduced to the pipe flows to the lower end of the pipe, whereby the entire length of the inside of the pipe may be formed with a lining.

3. A method as claimed in claim 2, wherein the pipe is fitted with a flange at each end and wherein covers are fitted to the flanges, the covers being spaced from their respective end flanges of the pipe so that liquid mixture flows into the annular spaces between the covers and the flanges whereby the lining, when formed, extends radially at each end of the pipe to provide at each end an end face of the lining material integral with the lining itself.

4. A method as claimed in claim 1, wherein the synthetic plastics material is a polyurethane made from a urethane elastomer prepolymer by reaction with a suitable curing agent.

5. A method as claimed in claim 4, wherein the rate of introduction of the liquid polyurethane into the pipe is such that the time taken to introduce the selected amount comprises not more than 50% of the pot life of the polyurethane.

6. A method as claimed in claim 5, wherein prior to introduction of the liquid polyurethane, the pipe is preheated to a suitable temperature depending upon the required pot life of the material and the viscosity of the liquid material at that temperature.

7. A method as claimed in claim 1, wherein after spinning the pipe is held at a given temperature to complete the curing of the plastics lining material.

8. A method as claimed in claim 1, wherein after introduction of the liquid mixture and at the start of spinning, hot gas is blown through the pipe to cause entrained air bubbles in the liquid mixture to be removed.

9. A method as claimed in claim 1, wherein at the commencement of and during spinning of the pipe to distribute the liquid mixture, pressure rollers are applied to the pipe to ensure that its axis is straight during spinning.

10. A method as claimed in claim 4 wherein said urethane elastomer prepolymer comprises an isocyanate-terminated polyether.

11. A method as claimed in claim 4 wherein said urethane elastomer prepolymer comprises an isocyanate-terminated polyether and said curing agent comprises a diamine.

* * * * *